(12) United States Patent
Parrott

(10) Patent No.: US 11,970,340 B2
(45) Date of Patent: Apr. 30, 2024

(54) STAND ALONE START/STOP STATION FOR USE WITHIN CONVEYOR SYSTEM

(71) Applicant: Industrial Maintenance Services, Inc., Alexander, AR (US)

(72) Inventor: Michael G. Parrott, Sherwood, AR (US)

(73) Assignee: Industrial Maintenance Services, Inc., Alexander, AR (US)

( * ) Notice: Subject to any disclaimer, the term of this patent is extended or adjusted under 35 U.S.C. 154(b) by 230 days.

(21) Appl. No.: 17/732,937

(22) Filed: Apr. 29, 2022

(65) Prior Publication Data

US 2023/0348198 A1 Nov. 2, 2023

(51) Int. Cl.
*B65G 43/00* (2006.01)
*H02P 1/12* (2006.01)
*H02P 9/08* (2006.01)

(52) U.S. Cl.
CPC ............... *B65G 43/00* (2013.01); *H02P 1/12* (2013.01); *H02P 9/08* (2013.01); *B65G 2203/0266* (2013.01)

(58) Field of Classification Search
CPC ... B65G 43/00; B65G 2203/0266; H02P 1/12; H02P 9/08; H01H 47/001; H01H 47/223
See application file for complete search history.

(56) References Cited

U.S. PATENT DOCUMENTS

| | | | | |
|---|---|---|---|---|
| 5,141,380 A | * | 8/1992 | Kato | B65G 1/0421 414/281 |
| 5,143,194 A | * | 9/1992 | Sang | B65G 43/08 198/810.01 |
| 5,150,781 A | * | 9/1992 | Deisenroth | B65G 47/54 198/349.8 |
| 5,482,153 A | * | 1/1996 | Abraham | B66B 27/00 198/322 |
| 6,837,363 B2 | * | 1/2005 | Munzebrock | G05B 9/03 198/502.1 |
| 10,654,658 B2 | * | 5/2020 | Hamaguchi | G05B 19/409 |
| 2015/0225188 A1 | * | 8/2015 | Belluk | B65G 67/02 340/12.5 |

* cited by examiner

*Primary Examiner* — Mark A Deuble
(74) *Attorney, Agent, or Firm* — Richard Blakely Glasgow

(57) ABSTRACT

A significantly self-contained station for providing selective control and operation of motorized equipment (such as a conveyor) via a momentary contact switch or wireless remote, where the self-contained station is connected to and receives power from an existing service disconnect line of the equipment, where upon the service disconnect line being powered, the self-contained station receives power to provide electrical signals to a motor contactor of the self-contained station, which then selectively provides electrical signal to a motor of the equipment to selectively operate the equipment.

5 Claims, 4 Drawing Sheets

STAND ALONE START/STOP STATION FOR USE WITHIN CONVEYOR SYSTEM

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Conveyor systems are common pieces of mechanical equipment that move materials from on location to another. These systems are used in a wide variety of industries because they provide a means for quickly transporting products or materials in an efficient manner. Conveyor systems come in a variety of sizes, from the small conveyors found at the grocery store check-out to large industrial conveyor systems used in the packaging and logistics industries. A conveyor system is often the lifeline to a company's ability to effectively move its product in a timely fashion. The steps that a company can take to ensure that it performs at peak capacity, include regular inspections and system audits, close monitoring of motors and reducers, keeping key parts in stock, and proper training of personnel. And of course, while all conveyor systems must be used carefully to avoid injuries, the importance is paramount in industries and facilities where large industrial conveyor systems are used.

In many large facilities using these types of conveyor systems, the system is made of a lot of moving parts, including multiple conveyors. And in an instance where there is an issue at one conveyor in the entire system, often times the entire system must be shut down from the main control panel that provides power to the entire system and all of its components. Of course, requiring workers to shut down the entire system can be problematic for several reasons. First and foremost, in many situations, shutting down a conveyor of the system needs to be done immediately upon occurrence of a problem, as often times, there is some danger of injury if the conveyor is allowed to run for any period of time after the problem occurs. If the worker is required to go to the main control panel (MCP) to stop the conveyor (and then, again, to restart the conveyor after the problem has been solved), they might have to walk a considerable distance, as the MCP can often times be more than one hundred feet from any given conveyor in the system. In addition, shutting down the whole system, even momentarily, can cause major interruptions in the facility, decreasing overall efficiency of the process and potentially costing significant amounts of money.

The inventor hereof has recognized that a stand alone start/stop station that can provide electrical control options for a single motor in a large system by positioning the station between the main service disconnect and the motor can provide an efficient means for stopping a conveyor instead of switching off the service disconnect (resulting in the stoppage of the entire system).

BRIEF SUMMARY OF THE INVENTION

The present invention is generally directed to an assembly for providing electrical control options for a single motor in a large system, providing a means for a user to stop, start, and/or reverse a single piece of equipment (such as a conveyor) driven by the motor, thus preventing the need for the entire system to be stopped. In one embodiment, the assembly of the present invention provides a means for selectively controlling a motorized conveyor that is part of a large conveyor system, allowing for the conveyor to be singled-out for selective operation while maintaining the working abilities of remaining system components. In one embodiment, the components of the present invention are housed in an enclosure intended to protect the assembly components from outside elements and also protect the electrical components from inadvertently being activated by a user, resulting in the unintended starting or stopping of the conveyor. In one embodiment, an auto-start mechanism is incorporated into the assembly, and other embodiments provide start/stop/reverse speed control and remote control capabilities.

These and other objects, features, and advantages of the present invention will become better understood from a consideration of the following detailed description of the preferred embodiments and appended claims in conjunction with the drawings as described following:

DETAILED DESCRIPTION OF THE INVENTION

Figure 1:
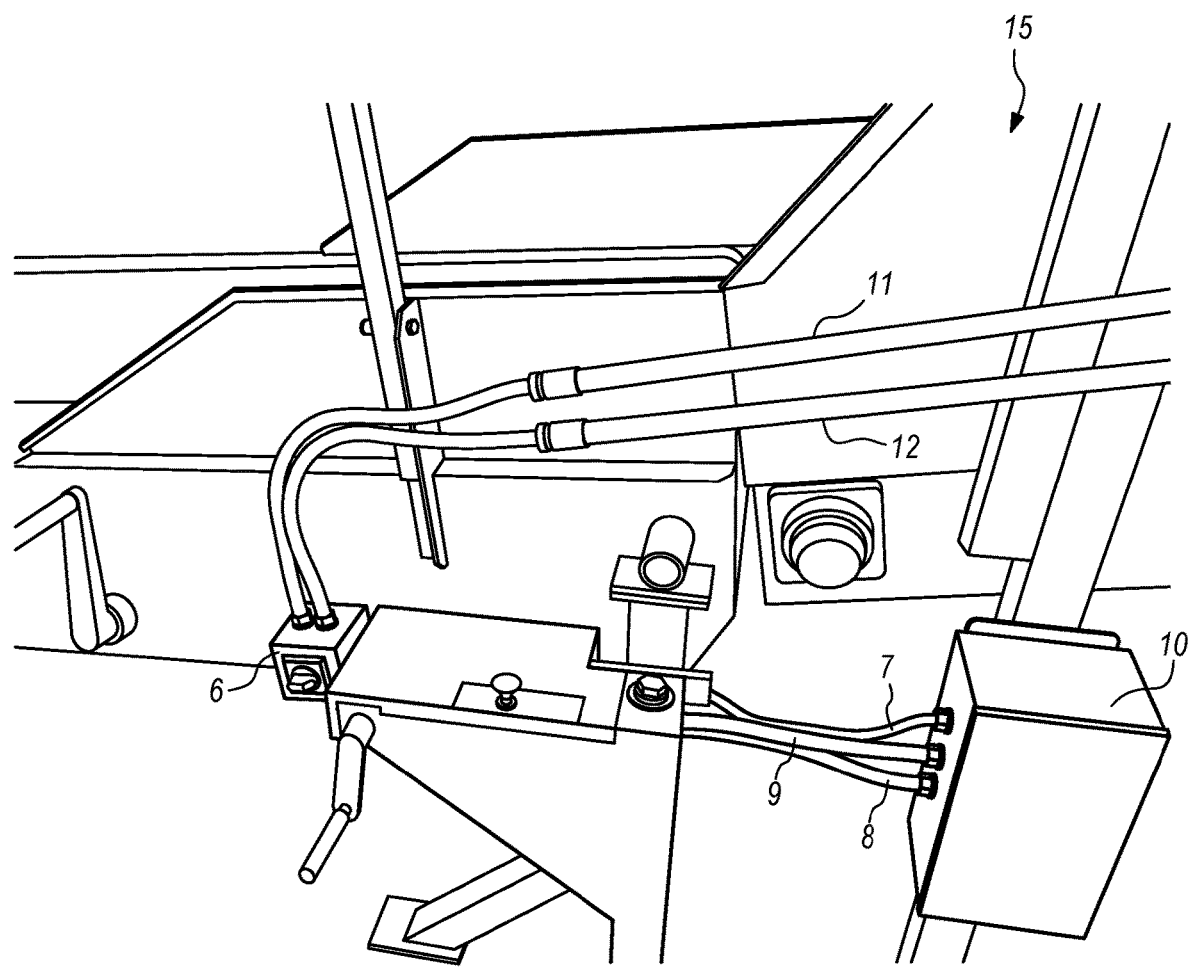
FIG. 1 is a perspective view of the stop start station of the present invention connected between the service disconnect and the equipment being controlled.
Figure 2:
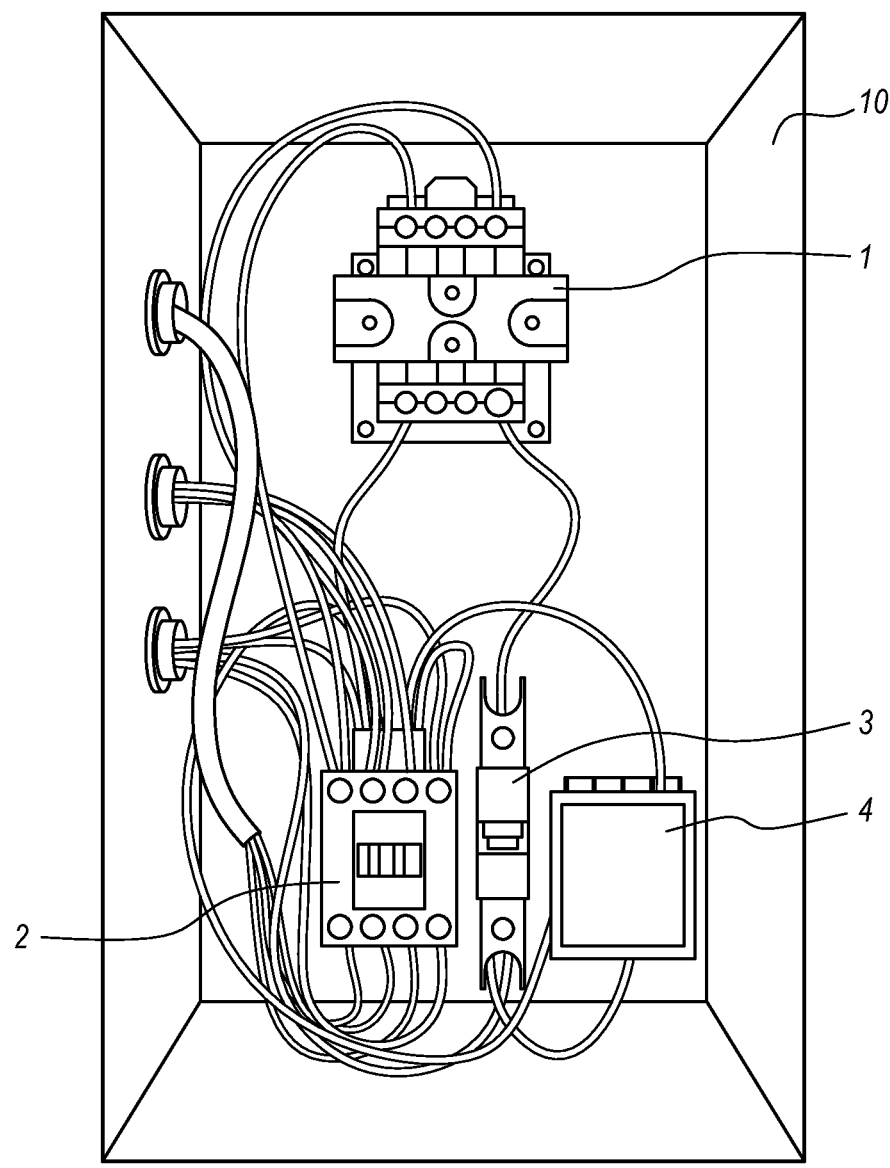
FIG. 2 is a perspective view of the internal components of the stop start station of the present invention inside a housing.

With reference to FIGS. 1-4, the preferred embodiments of the start stop station 15 of the present invention may be described. Generally speaking, the present invention is directed to an assembly for providing electrical control options for a single motor in a large system, providing a means for a user to selectively start/stop a single piece of equipment driven by the motor, thus preventing the need for the entire system to be stopped just to stop the single piece of equipment. While there are a number of applications for which the present invention can be utilized, to effectively describe the present invention in detail, the example of using the present invention to selectively operate a single conveyor in an overall conveyor system is used. Thus, the present invention may be described herein as an assembly for providing selective start and stop operation of a motorized conveyor, wherein the start and stop operation allows a user to selectively mange the operation of a single conveyor using the assembly as the isolated controls for the conveyor, preventing the need to shut down other vital equipment in the overall system.

First, to understand the novelty of the present invention and the improvements to industry that are capable with the present invention, it is important to understand the industrial environment in which the present invention is intended to be used. Industrial facilities utilize systems that are made up of many pieces of mechanical equipment that are electrically controlled using one or more main power sources. In many systems, conveyors are used to move products or materials between other functional equipment, often times with multiple conveyors joined together to form a path or paths for material to travel into and out of the various pieces of equipment. Traditionally, conveyor systems consist of a belt stretched across two or more pulleys, where the belt forms a closed loop around the pulleys so it can continually rotate. One pulley, often known as the drive pulley, drives the belt, allowing products or materials on the belt to move between locations as the belt rotates due to the pulleys. The belt typically rests on a support, which acts as a firm surface on which the belt rotates so that the products and materials on the belt do not cause the belt to sag ultimately reducing the movement capabilities of the belt. The support keeps the belt taut so that it efficiently moves the products or materials along the belt path. A drive system, which may include the drive pulley and a motor, allows the conveyor belt to move. OSHA Regulations require that a means for stopping the motor or engine shall be provided at the operator's station, and if the operator's station is at a remote point, similar provisions for stopping the motor or engine shall be provided at the motor or engine location. Thus, depending upon the size of the system, multiple emergency stops may be located throughout the system and facilities, and most electrical control panels will also have a system start/stop button as well. Finally, OSHA regulations require that emergency stop switches are arranged so that the conveyor cannot be started again until the actuating stop switch has been reset to running or "on" position. Of course, because there are often times many different pieces of equipment and conveyors are connected to the same emergency system or power source, an issue with one piece of equipment can cause stoppage of multiple equipment or even an entire section of the facility or system. Furthermore, some equipment is connected to a system disconnect switch, which is operable to connect and disconnect the equipment from a main power source. So, when service to a piece of equipment needs to be stopped, the service disconnect must be shut down, disconnecting power from the equipment.

The present invention is designed to be positioned in the industrial system at a connection point between the service disconnect 6 and the equipment, such that power is provided to the present invention via the service disconnect line 8, and the start stop station 15 of the present invention provides the power control to the equipment downstream of the start stop station. In order to act as the power control of the equipment, the present invention generally includes a housing with an enclosure 10 for protection of internal components that are operable to selectively control the start and stop of the downstream equipment. Further, because the start stop station 15 of the present invention is connected to the service disconnect 6 (an existing power source providing power to the equipment), a separate power source is not needed for the start stop station of the present invention. This means that unlike other emergency systems, no additional electrical cables, conduits, or other similar equipment is needed.

Generally speaking, the components of the start stop station of the present invention include a control transformer 1, a motor contactor 2, a circuit breaker or fuse 3, an auto start module or wireless remote module 4, a momentary contact switch 5, the existing service disconnect 6, a motor feed line (or conduit) 7 from the existing motor to the internal components of the start stop station, a control station line (or conduit) 9 from the internal components of the start stop station to the momentary contact switch, power supply from the service disconnect 6 to the internal components of the start stop station via a line (or conduit) 8, and the housing or enclosure 10 for protecting the internal components of the start stop station. In one embodiment, a NEMA 4 enclosure is used to house and protect the internal components because NEMA 4 is suitable for indoor or outdoor uses, provides good protection against dust, rain or other environmental contaminants, protects from water or splashes, etc. Of course, other types of enclosure materials can be used depending on the nature of the environment where the start stop station is being utilized. The enclosure preferably accommodates a back plate suitable for mounting the internal components, and the size of the enclosure is dependent on horsepower of the motor and ampere rating of voltage.

One of the internal components of the start stop station of the present invention is a control transformer 1. The control transformer 1 is operable to supply control voltage to the start stop station 15. When voltage is applied to the start stop station 15 via the service disconnect line 8, the control transformer 1 sends an active signal to the auto start module 4. In the preferred embodiments, the control transformer 1 can be a 480 VAC transformer or 120 VAC transformer. The start stop station of the present invention also includes a motor contactor 2 with normally open aux contacts. The motor contactor 2 includes a coil, enclosure, and contacts. The motor contactor 2 is operable to power the motor when the contactor coil is energized. In the preferred embodiment, the contacts are usually (but not always) normally-open, so that power to the load is shut off when the coil is de-energized (and thus, the start/stop station does not provide power to the motor of the equipment). The start stop station 15 of the present invention also includes a circuit breaker or fuse 3 (such as a 2 amp fuse) to provide an additional safety device built into the station in the event of excessive current.

In the preferred embodiment, the start stop station 15 of the present invention also includes an auto start module 4. The auto start module is a programmable relay configured in the one shot mode that will energize the coil of the motor contactor after 500 milliseconds. This will engage the normally open contacts creating a "sealed in" state. The auto start module 4 is designed to auto start the start/stop station once power is supplied to the service disconnect line 8 (and thus, power is supplied to the start/stop station 15). This module 4 allows the start/stop station 15 of the present invention to automatically start up upon power to the service line so that the start/stop station 15 can be used to operate the equipment to which the start/stop station is connected. Once the start/stop station 15 receives power and the auto start module 4 is activated, the auto start module 4 is deactivated after approximately 0.5 seconds. In one embodiment, the auto start module is set for a 200-millisecond delay, allowing for the protection of components in the main control panel from normal arching of contacts, ultimately increasing the life of the components.

Figure 3:
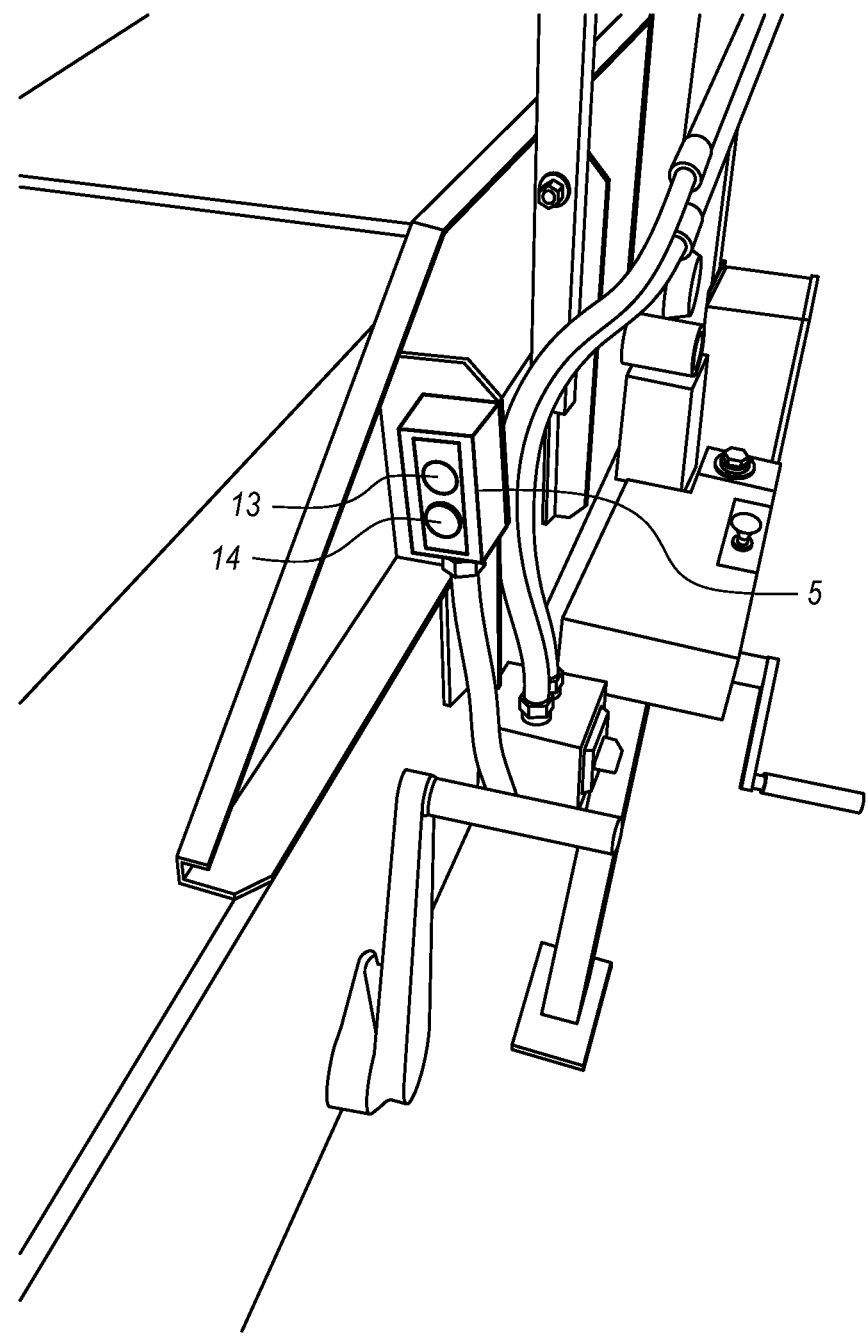
FIG. 3 is a perspective view of the stop start station of the present invention connected between the service disconnect and the equipment being controlled.

Once the start/stop station 15 is powered and ready for selective operation of the equipment to which it is connected, a start/stop station momentary contact switch 5 (such as a module with buttons for use by the operator) is used to selectively control the equipment. In one embodiment, the momentary contact switch simply includes a start button 13 and a stop button 14, such as shown in FIG. 3, allowing the operator to selectively start and stop the equipment to which the start stop station is connected. In other embodiments, the momentary contact switch 5 can include controls for moving the conveyor of the equipment forward or backward/reverse, up and down, speed of the conveyor, or other similar controls. In alternative embodiments, the start stop station of the present invention includes a wireless/remote module (not shown). The wireless/remote module allows for remote operation of the start stop station when the operator is not near the stationary momentary contact switch 5. For example, in one embodiment, a wireless remote having capabilities of controlling the conveyor from approximately 300 feet of distance is provided.

Of course, because the start stop station 15 is used to selectively operate a conveyor (or other similar industrial equipment), the start stop station must be able to power the motor of the conveyor or equipment. As noted above, the start stop station of the present invention includes a motor feed line 7 that electronically connects the start stop stations electrical components with the electrical components of the motor. Once power is provided to the start stop station 15 via the service disconnect line 8, the start stop station can then send electrical signals to the motor via the motor feed line 7 allowing for the selective operation of the motor and therefore conveyor or other equipment. In addition, the start stop station's electrical components are also electronically connected to the momentary contact switch 5, allowing the switch to be used to selectively send electrical signals to the electronic components of the start/stop station, which then can transmit corresponding electrical components to the electrical components of the equipment motor via the motor feed line 7. In order to allow for electrical wires to extend from the enclosure 10 where the start/stop station's core electrical components are stored to the momentary contact switch, an electrical conduit or line 9 may be used.

Having generally described the various components of the start stop station of the present invention, one suitable method for use of the start stop station to selectively operate a conveyor can now be described. As noted, the start stop station 15 is a stand-alone unit that receives power from an existing service disconnect line 8. As long as the service disconnect line 8 is powered, the start stop station 15 is also connected to power. Voltage from the service disconnect line 8 is applied to the start stop station 15 and the control transformer 1 activates to transmit a signal to the auto start module 4. At this point, voltage is applied to the coil of the motor starter until seal in is achieved. In the preferred embodiment, 120 volts of AC power is applied to the coil for approximately 0.5 seconds. The auto start module 4 is deactivated (preferably after 0.5 seconds) and is set on a short delay to start. Once the start stop station is active, electrical signal is provided to the momentary contact switch 5 (and/or wireless remote), allowing the operator to selectively control the conveyor using the momentary contact switch 5 (and/or wireless remote). As the conveyor is running, the operator can selectively push the appropriate button (such as 13 or 14) of the momentary contact switch, allowing the operator to selectively stop the conveyor, selectively start the conveyor, or selectively control the speed, direction, or other characteristic of the conveyor. This not only provides a simple way for operators to selectively control the conveyor (with little to no training required) but because the stop start station is self-contained and needs only to receive power from existing service disconnect lines, the present invention can also be used with conveyors that do not have main control cabinets. This also allows for the temporary stopping of the conveyor without requiring the operator to fully disconnect or shut off the service disconnect line.

Figure 4:
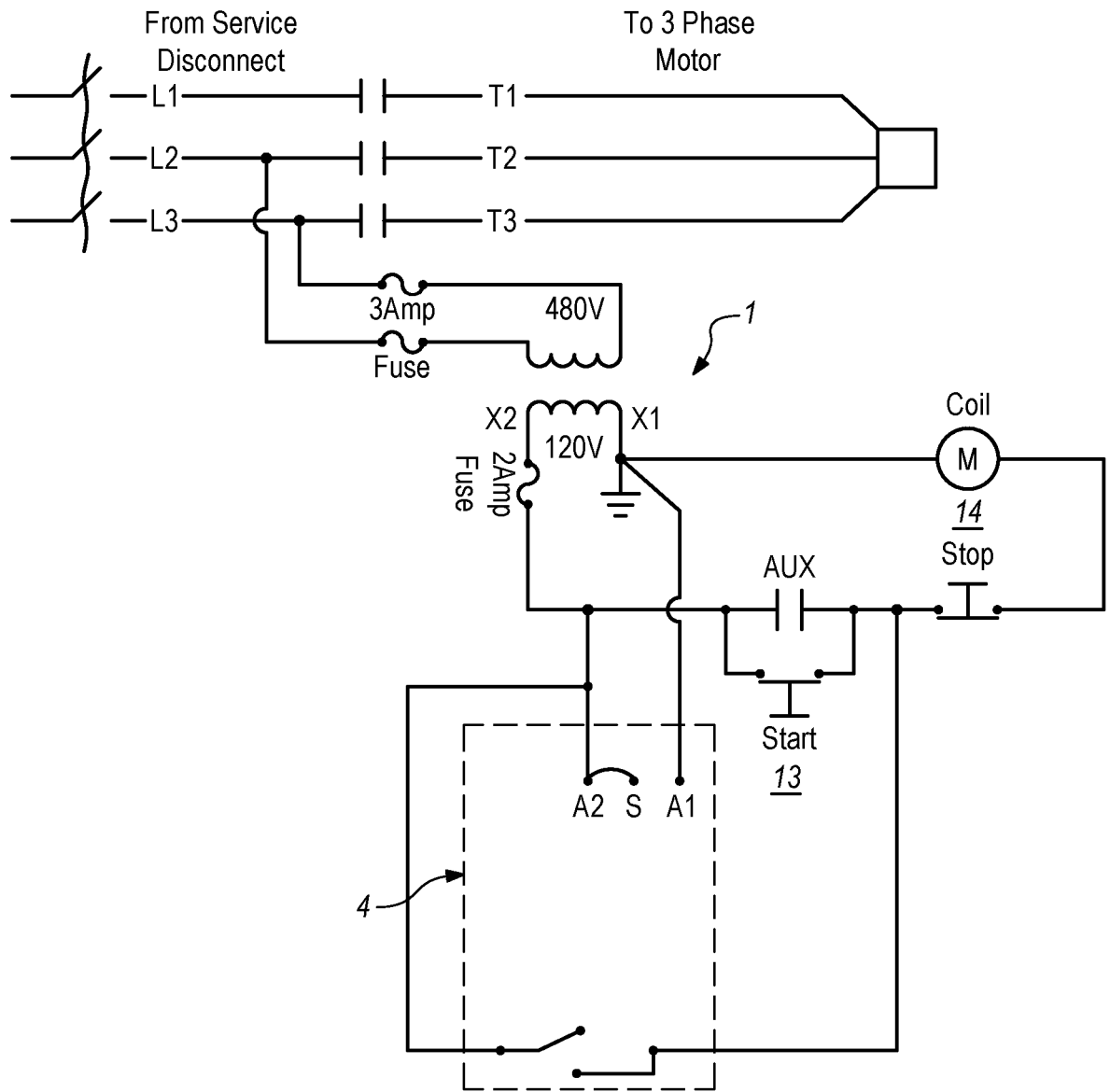
FIG. 4 is an electrical diagram of the stop start station of the present invention.

FIG. 4 is an electrical diagram of the start stop station 15 of the present invention. The MCP or Main Control Panel in the facility controls the function of several conveyors. System start is initiated, and all E-Stops are ready for normal operation. The master control relay is energized in the MCP Cabinet housing all the relays, PLC, motor contactors and controls. The MCP engages the desired conveyors, but only conveyor P1 has the start stop station of the present invention installed.

Voltage is applied to conveyor P1 conveyor's service disconnect 6. Two conduits are connected to the top of the service disconnect: conduit 11 and conduit 12. Conduit 11 is a power conduit containing four wires—L1, L2, L3 and a ground wire. Conduit 12 contains control wires to the PLC communicating the state of the disconnect, on or off.

L1, L2 and L3 have voltage. L1 and 2 supply voltage to the primary of the control transformer 1. This induces 120 volts (control voltage) to the auto start module 4 on pins A1, S and 15, which starts the one-shot process. After the auto start module 4 engages, "pin 15" (i.e., the signal input) applies voltage signal to "pin 18" (i.e., the signal output) from the relay wiper that was resting on "pin 16" (i.e., the relay contact) for 500 milliseconds, which energizes the coil in FIG. 4 through the normally closed contacts of the stop button 14. This completes the path to the coil of the motor contactor 2, which closes the three motor contacts and the AUX contacts in FIG. 4. The AUX contacts furnish the "seal in" voltage to the coil keeping it engaged until the path of voltage is interrupted either by depressing the stop button 14 on the start stop station or removal of the source voltage. Removal of source voltage from the system is commonly achieved by depressing a stop button 14 within the control network of the system or engaging the E-Stop of the system. Once the start stop station starts, the three motor contacts engage the motor of the system and the AUX contacts (which are mechanically interlocked with the motor contacts) to keep the coil energized and keep the motor running. Once the stop button 14 is pressed, the control voltage to is removed from the coil, which causes the components to go to their normal or deenergized/stopped state. This can also be achieved by voltage being removed by the MCP because of either global stop or emergency stop. With the conveyor system running, the operator has the option to start or stop the conveyor without interfering with the normal flow of product or material. If the power is removed from the system, the start stop station is in its off but ready state. Power must be applied to the start stop station for it to operate.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a Markush group or other grouping is used herein, all individual members of the group and all combinations and subcombinations possible of the group are intended to be individually included. All references cited herein are hereby incorporated by reference to the extent that there is no inconsistency with the disclosure of this specification. When a range is stated herein, the range is intended to include all sub-ranges within the range, as well as all individual points within the range. When "about," "approximately," or like terms are used herein, they are intended to include amounts, measurements, or the like that do not depart significantly from the expressly stated amount, measurement, or the like, such that the stated purpose of the apparatus or process is not lost.

The present invention has been described with reference to certain preferred and alternative embodiments that are intended to be exemplary only and not limiting to the full scope of the present invention, as set forth in the appended claims.

The invention claimed is:

1. A self-contained station useful for selectively operating an equipment having a motor powered by a service disconnect line, the self-contained station comprising:
   a. a housing forming an internal compartment;
   b. a control transformer positioned inside the internal compartment, wherein the control transformer is operable to receive an electrical signal from the service disconnect line;
   c. a motor contactor positioned inside the internal compartment, wherein the motor contactor is operable to receive an electrical signal from the control transformer and allow for the selective control of the motor of the equipment;
   d. an auto start module positioned inside the internal compartment, wherein the auto start module is operable to receive an electrical signal from the control transformer;
   e. a momentary contact switch positioned external to the housing, wherein the momentary contact switch is operable to receive power from the control transformer and is configured to allow for the selective operation of the equipment by selectively causing electrical signals to be sent to the motor of the equipment via the motor contactor.

2. The self-contained station of claim 1, wherein the equipment comprises a conveyor.

3. The self-contained station of claim 1, wherein the housing is a NEMA 4 enclosure.

4. The self-contained station of claim 1, further comprising a wireless remote communicatively connected to the motor contactor and operable to allow the selective operation of the equipment.

5. The self-contained station of claim 1, further comprising a fuse positioned inside the internal compartment.

* * * * *